United States Patent Office 3,728,267
Patented Apr. 17, 1973

---

3,728,267
PEELING TYPE PICKLING COMPOSITIONS
Nobuyoshi Hirota and Tsutomu Matsushita, Nagasaki, Japan, assignors to Mitsubishi Jukogyo Kabushiki Kaisha, Tokyo, Japan
No Drawing. Filed Dec. 30, 1970, Ser. No. 102,917
Claims priority, application Japan, Jan. 14, 1970, 45/3,722; Oct. 9, 1970, 45/88,525; Nov. 25, 1970, 45/104,561
Int. Cl. D06l 1/00
U.S. Cl. 252—142                                       5 Claims

---

ABSTRACT OF THE DISCLOSURE

A peeling type composition for use in the pickling treatment, which comprises a film-forming composition consisting essentially of sodium alginate or sodium alginate and gelatin, with at least one of starch, bentonite, talc, powdered silica and powdered active terra alba added thereto; a liquid acid or solid acid; a penetrant; and a solution promoting agent.

---

This invention relates to peeling type compositions for use in a pickling treatment.

Heretofore, a dipping process has commonly been employed in the scale removing and rust proof treatment of steel materials by pickling (hereinafter referred to simply as pickling treatment). However, in practicing the dipping process for the pickling treatment, while no substantial problem will be encountered where the material to be treated is small in size, a wide space and a large amount of treating solution are required and hence the cost of treatment becomes extremely high where the material to be treated is large in size. A spray process has also been employed in the pickling treatment but in this case, due to an insufficient quantity and drying of a pickling solution, the picking solution must be sprayed repeatedly to attach a sufficient quantity of the picking solution to the material to be treated and in addition, the operation itself is cumbersome. There are also been employed a method wherein a pickling solution in the form of paste with a powdery organic or inorganic thickner added thereto is coated on the surface of a steel sheet, but this method has the disadvantage that the removal of the thickner from the treated surface subsequent to the treatment is time-consuming and laborious.

The primary object of the present invention is to provide a pickling composition which enables a picking treatment to be completely attained, only by applying the composition directly to the surface of a material to be treated and peeling the composition from said surface which is then in the form of a peelable film as a result of chemical change, and which does not call for subsequent water-washing, neutralization and rust proof treatment, and therefore, enables the cost of treatment to be reduced.

According to the invention there is provided a pickling composition which comprises a composition capable of forming a peelable film and consisting essentially of sodium alginate and gelatin, with one or more of starch, bentonite, talc, powdered silica and powdered active terra alba added thereto; a liquid acid or a powdered solid acid; a penetrant; and if necessary, an agent having the property of promoting the solution of iron. The pickling composition of the instant invention is adapted for use with ships, large-sized tanks, bridges and other steel structures.

In formulating the pickling composition according to the present invention, sodium alginate which has the property of gelatinizing upon forming iron alginate by the reaction with the iron salt which is formed by the reaction between the acid in the composition and the iron at the surface of a material to be treated, and gelatin which has the property of quickly gelatinizing when the pH of the composition is lowered to the range of 3–5 by the reaction between the acid and iron, are mixed as basic ingredients to impart the composition a film-forming property, and then at least one of starch, a water-soluble synthetic resin, bentonite, talc, powdered silica and powdered active terra alba is added to the resultant mixture, to form the base of the composition. Thereafter, a liquid acid or a powdered solid acid and a penetrant are added to the aforesaid base, and if necessary, an agent having the property of promoting the solution of iron is further added thereto.

As stated, the sodium alginate incorporated in the composition reacts with the iron salt which is formed by the reaction between the acid present in the composition and the iron at the surface of a material to be treated, to form iron alginate and thereby to gelatinize the composition. Similarly, the gelatin is quickly gelatinized when the acidity of the composition reaches a pH of 3–4 as a result of the reaction between the acid and iron.

The sodium alginate starts to gelatinize in the state of a solution at a pH of 3 or lower and in the presence of Fe··· ion, while the gelatin starts to gelatinize at a pH of 3–5. Therefore, when the composition incorporating these compounds is applied to the surface to be treated, the iron alginate and the gelatin gelatinize in the order mentioned, thereby caking the starch, the water-soluble resin, bentonite, talc, powdered silica and powdered active terra alba incorporated in said composition and enabling the composition to form a film having a strong cohesive force. These film-forming materials contain a liquid acid and have a lasting rust-removing effect for the surface to be treated over an extended period of time (3–4 hours).

When the pickling treatment is about to be completed, a continuous film of high tear strength is formed as a result of evaporation of water in the composition and the gelatinization and caking of the ingredients mentioned above. Therefore, by peeling the film, the rust present on the surface to be treated is completely removed and the pickling treatment is accomplished. The penetrant is used to cause the liquid acid to quickly penetrate deep into the rust after the composition has been applied to the surface to be treated, and the solution promoting agent is used to promote the iron solving action of the acid by reducing the Fe··· ion, formed in the liquid acid by pickling, to Fe·· ion. Both of these agents serve to accelerate the rust-removing effect.

Upon application of the compound of the instant invention to the rusty surface of a steel material, the acid forms iron alginate at first while performing a rust-removing action by dissolving the rust, and at the same time the pH of the composition rises gradually, so that the composition forms a film which becomes a semi-solid film upon drying. This film can be easily peeled from the surface to be treated. By peeling the film, the pickling treatment is completed and a clean, rust-free, metallic surface can be obtained. The composition applied should be left on the surface for about 2–3 hours before it forms a peelable film.

The present invention will be further described by way of example hereinafter:

Formulation 1

|  | Parts by weight |
|---|---|
| Sodium alginate | 6 |
| Powdered gelatin | 0.3 |
| Starch (soluble in water) | 20 |
| Phosphoric acid (20% by weight solution) | 74 |
| Nonionic surface active agent (penetrant) | 0.5 |

A desired composition in the form of paste is prepared by first dissolving gelatin in the phosphoric acid solution heated at 50–60° C. and then adding the other ingredients with stirring.

Commercially available AG Gum (the trade name of a product of Daiichi Kogyo Seiyaku K.K.) can be used for the sodium alginate. The gelatin, the starch and the phosphoric acid may be those being sold on the market but of the highest grade for chemical use. The nonionic surface active agent may also be the ordinary one available on the market, and is, for example, PLYSURF A-125 (the trade name of a product of Daiichi Kogyo Seiyaku K.K.).

Formulation 2

| | Parts by weight |
|---|---|
| Sodium alginate | 10 |
| Powdered talc or bentonite | 50–80 |
| Hydrochloric acid (15% by weight solution) | 70–100 |
| Nonionic surface active agent | 0.3–0.5 |

Formulation 3

| | Parts by weight |
|---|---|
| Sodium alginate | 3–5 |
| Powdered talc or bentonite | 50–80 |
| Phosphoric acid (15% by weight solution) | 40–60 |
| Hydrochloric acid (5% by weight solution) | 40–60 |
| Nonionic surface active agent | 0.3–0.5 |

Formulation 4

| | Parts by weight |
|---|---|
| Sodium alginate | 3–5 |
| Powdered talc | 50–80 |
| Powdered silica | 3–5 |
| Sulfuric acid (10% by weight solution) | 120 |
| Nonionic surface active agent | 0.3–0.5 |

In Formulations 2, 3 and 4 above, the sodium alginate is the same as the commercially available product mentioned in Formulation 1, and for the nonionic surface active agent, PLYSURF A-210 (the trade name of a product of Daiichi Kogyo Seiyaku K.K.) may be used besides PLYSURF A-125 mentioned in Formulation 1. For the powdered silica, one which is colloidal and amorphous and has a surface area of about $200\pm50$ m.$^2$/g., such as NIPSIL VN-3 (the trade name of a product of Nippon Silica Kogyo K.K.) or AEROSIL (the trade name of a product of Degussa Company in Germany), is preferably used. The other ingredients may be the highest grade products for chemical use which are available on the market.

A composition in the form of paste is prepared by adding the ingredients to the specific acid solution with sufficient stirring.

Formulation 5

| | Parts by weight |
|---|---|
| Sodium alginate | 3–5 |
| Powdered silica | 20–40 |
| Phosphoric acid (15% by weight solution) | 40–60 |
| Nitric acid (5% by weight solution) | 40–60 |
| Nonionic surface active agent | 0.3–0.5 |

Formulation 6

| | Parts by weight |
|---|---|
| Sodium alginate | 3–5 |
| Powdered silica | 15–25 |
| Powdered active terra alba | 15–25 |
| Phosphoric acid (15% by weight solution) | 40–60 |
| Hydrochloric acid (5% by weight solution) | 40–60 |
| Nonionic surface active agent | 0.3–0.5 |

With Formulations 5 and 6, a desired composition can be prepared in the same manner as in the case of Formulations 2–4. The quality grades of the ingredients are the same as those of the ingredients in the preceding formulations. For the powdered active terra alba in Formulation 6, Galeon Earth (the trade name of a product of Mizusawa Kagaku Kogyo K.K.) may be used for example.

Formulation 7

| | Parts by weight |
|---|---|
| Sodium alginate | 3–5 |
| Powdered silica | 15–25 |
| Powdered active terra alba | 15–25 |
| Ultraphosphoric acid | 5–20 |
| Acid ammonium fluoride | 1–5 |
| Powdered nonionic surface active agent | 0.3–0.5 |

The above-mentioned ingredients are mixed and homogeneously finely divided in a mill, to form a composition. The composition is used in the form of paste by adding 40–80 parts by weight of water thereto before use. The ultraphosphoric acid is a polymerized phosphoric acid represented by the general formula $(xH_2O)P_2O_5$ wherein $x$ is greater than 0 but smaller than 1. Besides the polymerized phosphoric acid set forth above, polyphosphoric acids represented by the Formula $H_{n+2}P_nO_{3n+1}$ wherein $n$ is 2, 3, 4 or 5, may also be used as the polymerized phosphoric acid. The acid ammonium fluoride serves to promote the iron solving action of the acid. For the nonionic surface active agent, a powdery one, e.g. SOLGEN 50 or 70 (the trade name of a product of Daiichi Kogyo Seiyaku K.K.) may be used.

Formulation 8

| | Parts by weight |
|---|---|
| Sodium alginate | 3–5 |
| Powdered silica | 15–25 |
| Powdered active terra alba | 15–25 |
| Polyphosphoric acid | 5–10 |
| Citric acid | 10–15 |
| Stannous chloride | 1–3 |
| Powdered nonionic surface active agent | 0.3–0.5 |

The above ingredients are mixed and milled in the same manner as in the case of Formulation 7, to prepare a composition. The composition is used by adding 40–80 parts by weight of water thereto with stirring. The tin ion is added as a solution promoting agent for iron, and metallic tin, stannous oxide and stannous sulfate may also be used besides the stannous chloride mentioned above.

The compositions obtained with Formulations 7 and 8, which are in the form of powder, are advantageous in storage and transportation, and are characterized by being of the type which is used by adding water thereto.

The steel surfaces which have been subjected to a pickling treatment with the compositions obtained with Formulations 5, 6, 7 and 8, are characterized by the fact that they do not call for post-treatments such as neutralization and rust proof treatment, and have the advantage that they are not subjected to rusting for as long as about 7 days after the pickling treatment even when left to stand in air at a temperature of 20° C. and a humidity of 75%, and furthermore, the surfaces can be painted successively after the pickling treatment.

EXAMPLE 1

The compositions obtained with Formulations 1, 2, 3 and 4 were individually applied in a thickness of 2–3 mm. by means of a brush on the surface of each of a 6 mm. and a 12 mm. thick steel sheet having a mill scale over the entire area thereof, and left to stand for 2–3 hours at normal temperature. The compositions thus applied each formed a semi-solid film. The continuous film was easily peeled as a unitary piece and a clean metal slurface was formed on the steel sheet. The surface was washed with water, subjected to a neutralization and rust proof treatment with 1% (by weight) aqueous sodium nitrite solution, stored indoor for 3 days, and painted with an epoxy-type paint. After the paint dried, the metal sheet was left to stand outdoor for 1 year but the condition of the painted surface was satisfactory and no difference was noted between it and the surface of a steel sheet which had been polished by sand blasting and painted.

EXAMPLE 2

The compositions obtained with Formulations 5, 6, 7 and 8 were individually applied on a 12 mm. thick steel sheet having a mill scale over the entire area thereof, in the same manner as in Example 1, and a clean metal surface similar to that in Example 1 was obtained.

Thereafter, the pickled surface was simply wiped with a clean cloth, painted with a paint comprising an alkyd resin, rubber chloride, epoxy resin or coal tar epoxy resin as a main vehicle, dried for 7 days and subjected to a test for adhesive strength of the paint by the cross-cut method. The result was that the paint was not peeled on any steel sheet. Further, the painted surface was subjected to a 3% salt water dipping test for 3 months and a 5% salt water spray test for 1 month, but no difference was noted between it and the surface of a steel sheet which had been treated by sand blasting and painted.

The compositions used in Examples 1 and 2 illustrated above were each prepared by mixing the respective ingredients set forth in the specific formulation in amounts which are mathematical averages of the minimum and maximum amounts of the respective ingredients specified in the formulation.

What is claimed is:

1. A film-forming peelable pickling composition for steel consisting essentially of from 3 to 10 parts by weight of sodium alginate or sodium alginate and gelatin, from 20–80 parts by weight of starch, bentonite, talc, powdered silica or powdered active terra alba; from 5 to 120 parts by weight of an acid selected from the group consisting of phosphoric acid, polyphosphoric acid, ultraphosphoric acid, hydrochloric acid, nitric acid, sulphuric acid, citric acid and mixtures thereof which is capable of imparting a pH of 3–5; from 0.3 to 0.5 part by weight of a non-ionic detergent; said composition being diluted with from 0 to 80 parts by weight of water.

2. A composition according to claim 1 including an iron solution promoting agent which is acid ammonium fluoride, stannous chlorine, metallic tin or stannous oxide.

3. A composition according to claim 1 containing 3 to 10 parts by weight of sodium alginate.

4. A method of pickling steel comprising applying to the steel the composition of claim 1.

5. A method of pickling steel comprising applying to the steel the composition of claim 2.

References Cited

UNITED STATES PATENTS

| | | | |
|---|---|---|---|
| 3,553,016 | 1/1971 | Foelsch | 252—142 X |
| 2,337,062 | 12/1943 | Page, Jr. | 252—142 UX |
| 3,018,245 | 1/1962 | Owen | 252—8.5 C |
| 3,153,450 | 10/1964 | Foster et al. | 252—8.55 R |
| 2,824,834 | 2/1958 | Cardwell et al. | 252—8.55 C |
| 2,264,389 | 12/1941 | Lamprey | 252—72 |

MAYER WEINBLATT, Primary Examiner

U.S. Cl. X.R.

134—3, 4, 41, 42; 252—136, 316, 317